United States Patent
Choi et al.

(10) Patent No.: US 12,451,333 B2
(45) Date of Patent: *Oct. 21, 2025

(54) PLASMA REACTION DEVICE AND COOLING METHOD THEREOF

(71) Applicant: NEW POWER PLASMA CO., LTD., Suwon-si (KR)

(72) Inventors: Dai Kyu Choi, Seoul (KR); Eun Seok Lim, Suwon-si (KR)

(73) Assignee: NEW POWER PLASMA CO., LTD., Suwon-si (KR)

( * ) Notice: Subject to any disclaimer, the term of this patent is extended or adjusted under 35 U.S.C. 154(b) by 391 days.

This patent is subject to a terminal disclaimer.

(21) Appl. No.: 18/010,531

(22) PCT Filed: Jul. 29, 2020

(86) PCT No.: PCT/KR2020/010002
§ 371 (c)(1),
(2) Date: Dec. 15, 2022

(87) PCT Pub. No.: WO2021/256605
PCT Pub. Date: Dec. 23, 2021

(65) Prior Publication Data
US 2023/0260761 A1     Aug. 17, 2023

(30) Foreign Application Priority Data

Jun. 16, 2020 (KR) .................. 10-2020-0073078

(51) Int. Cl.
*H01J 37/32* (2006.01)
(52) U.S. Cl.
CPC .. *H01J 37/32522* (2013.01); *H01J 37/32669* (2013.01)

(58) Field of Classification Search
None
See application file for complete search history.

(56) References Cited

U.S. PATENT DOCUMENTS 9,773,645 B2   9/2017  Lee et al.
2003/0226641 A1*  12/2003  Collins ............. H01J 37/32082
                                                      118/723 AN
(Continued)

FOREIGN PATENT DOCUMENTS

JP       2018-107102 A    7/2018
KR   10-2016-0039856 A    4/2016
(Continued)

*Primary Examiner* — Shamim Ahmed
(74) *Attorney, Agent, or Firm* — Bridgeway IP Law Group, PLLC; Sang Ho Lee; Hyun Woo Shin

(57) ABSTRACT

Provided are a plasma reaction device capable of cooling a reactor body and a magnetic core by circulating cooling water, and a cooling method thereof, the plasma reaction device including an annular loop space therein, and a body cooling channel therein, a magnetic core having a primary coil to generate plasma by exciting a gas in the annular loop space, a cooling block being in thermal contact with the reactor body or the magnetic core, and having a block cooling channel therein, a connecting block having a first water inlet pipe and a first water outlet pipe at a side thereof to supply cooling water at a first temperature, and having a second water inlet pipe and a second water outlet pipe at another side thereof to collect the cooling water at a second temperature higher than the first temperature, and a cooling water circulation line mounted between the connecting block, the cooling block, and the reactor body.

7 Claims, 2 Drawing Sheets

(56) References Cited

U.S. PATENT DOCUMENTS

| | | | | |
|---|---|---|---|---|
| 2007/0245963 A1* | 10/2007 | Choi | ................. | H01J 37/32357 |
| | | | | 156/345.48 |
| 2013/0278135 A1* | 10/2013 | Choi | .................. | H01J 37/3222 |
| | | | | 315/111.41 |
| 2013/0307414 A1* | 11/2013 | Choi | ................. | H01J 37/32816 |
| | | | | 315/111.51 |
| 2014/0130980 A1* | 5/2014 | Lee | ........................ | H01J 37/30 |
| | | | | 118/723 MP |
| 2023/0260762 A1* | 8/2023 | Choi | .................... | H01J 37/321 |
| | | | | 216/67 |

FOREIGN PATENT DOCUMENTS

| KR | 10-1655900 B1 | 9/2016 |
|---|---|---|
| KR | 10-2016-0129304 A | 11/2016 |
| KR | 10-2018-0104348 A | 9/2018 |
| KR | 10-1950027 B1 | 2/2019 |

* cited by examiner

PLASMA REACTION DEVICE AND COOLING METHOD THEREOF

TECHNICAL FIELD

The present invention relates to a plasma reaction device and a cooling method thereof, and more particularly, to a plasma reaction device capable of cooling a reactor body and a magnetic core by circulating cooling water, and a cooling method thereof.

BACKGROUND ART

Plasma discharge is used for gas excitation to generate an active gas including ions, free radicals, atoms, and molecules. The active gas is widely used in various fields and typically in various semiconductor manufacturing processes such as etching, deposition, cleaning, and ashing.

Currently, wafers or liquid crystal display (LCD) glass substrates for manufacturing semiconductor devices are increasing in size. As such, a scalable plasma source having a high plasma ion energy controllability and a large-area processability is demanded.

It is known that a remote plasma is very useful in such semiconductor manufacturing processes using plasma.

For example, the remote plasma is useful to clean a process chamber or in an ashing process for photoresist strips. However, because process chambers are increasing in volume due to the increase in size of substrates to be processed, a plasma source capable of remotely and sufficiently supplying a high-density active gas is also demanded.

Meanwhile, remote plasma reactors (or remote plasma generators) include those using a transformer coupled plasma source and those using an inductively coupled plasma source. The remote plasma reactors using the transformer coupled plasma source have a structure in which a magnetic core with a primary coil is mounted on a toroidal reactor body. The remote plasma reactors using the inductively coupled plasma source have a structure in which an inductively coupled antenna is mounted on a hollow tubular reactor body.

For example, a gas injected into a plasma reactor makes a gaseous material into a form of plasma including ions, free radicals, atoms, and molecules due to electrical force, and the plasma is used for various purposes such as etching, deposition, and cleaning at a remote place.

As disclosed in Korean Patent Publication No. 10-2016-0129304, an existing plasma reactor may include a cooling kit on a magnetic core where an induced electromotive force is generated, so as to prevent overheating of the magnetic core and reduce power loss.

However, the existing plasma reactor has many problems. For example, a cooling line of cooling water is not evenly provided inside and outside a reactor body and a magnetic core, cooling efficiency is greatly reduced because natural convection due to a difference in density based on expansion of heated cooling water is not usable, and plasma generation efficiency is also reduced because a flow rate, a temperature, a pressure, or the like of the cooling water is not accurately controllable.

The existing plasma reactor also has other problems. For example, even when plasma is not generated, i.e., in a standby mode, the cooling water is circulated the same as in a plasma mode to rapid cool the reactor without a plasma heating source, and thus particles are generated inside, or plasma ignition failure or plasma retention failure occurs due to the decrease in temperature of the reactor body.

DETAILED DESCRIPTION OF THE INVENTION

Technical Problem

The present invention provides a plasma reaction device capable of optimizing cooling efficiency by inducing cooling water to flow downward against thermal convection in a cooling block at a relatively low temperature and by inducing the cooling water to flow upward according to thermal convection in a reactor body at a relatively high temperature, and of preventing generation of particles and increasing plasma ignition and retention rates by preventing overcooling of the reactor body or a magnetic core by reducing a flow rate of the cooling water, increasing a temperature of the cooling water, or reducing a pressure of the cooling water in a standby mode, and a cooling method thereof. However, the scope of the present invention is not limited thereto.

Technical Solution

According to an aspect of the present invention, there is provided a plasma reaction device including a reactor body having a gas inlet at a side thereof, a plasma outlet at another side thereof, an annular loop space therein, and a body cooling channel therein, a magnetic core provided in a shape surrounding at least a part of the reactor body, and having a primary coil to generate plasma by exciting a gas in the annular loop space, a cooling block mounted outside the reactor body or the magnetic core, being in thermal contact with the reactor body or the magnetic core, and having a block cooling channel therein, a connecting block having a first water inlet pipe and a first water outlet pipe at a side thereof to supply cooling water at a first temperature, and having a second water inlet pipe and a second water outlet pipe at another side thereof to collect the cooling water at a second temperature higher than the first temperature, and a cooling water circulation line mounted between the connecting block, the cooling block, and the reactor body in such a manner that the cooling water provided through the connecting block passes through the block cooling channel of the cooling block, then passes through the body cooling channel of the reactor body, and is connected by the connecting block.

The cooling block may include a front block mounted in front of the reactor body or in front of the magnetic core, and a rear block mounted at rear of the reactor body or at rear of the magnetic core, and the cooling water circulation line may include a first cooling line having an end connected to the first water outlet pipe of the connecting block, and another end connected to a first block upper inlet of the front block, a second cooling line having an end connected to the first water outlet pipe, and another end connected to a second block upper inlet of the rear block, a third cooling line having an end connected to a first block lower outlet of the front block, and another end connected to a first body lower inlet of the reactor body, a fourth cooling line having an end connected to a second block lower outlet of the rear block, and another end connected to a second body lower inlet of the reactor body, a fifth cooling line having an end connected to a third body upper outlet of the reactor body, and another end connected to the second water inlet pipe of the connecting block, and a sixth cooling line having an end connected to a fourth body upper outlet of the reactor body, and another end connected to the second water inlet pipe of the connecting block.

The plasma reaction device may further include a measurement sensor mounted on the connecting block to selectively measure at least one of a flow rate, a temperature, and a pressure of the cooling water, and combinations thereof, and a controller for receiving a measurement signal from the measurement sensor to selectively output at least one of a flow rate control signal, a temperature control signal, and a pressure control signal for the cooling water, and combinations thereof.

The controller may include a plasma mode temperature controller capable of controlling the reactor body or the magnetic core to a plasma mode temperature during plasma generation, and a standby mode temperature controller capable of controlling the reactor body or the magnetic core to a standby mode temperature during standby.

The plasma mode temperature controller may selectively output at least one of a first flow rate control signal for controlling the flow rate of the cooling water to a first flow rate, a first temperature control signal for controlling the temperature of the cooling water to a first temperature, a first pressure control signal for controlling the pressure of the cooling water to a first pressure, and combinations thereof, to prevent overheating of the reactor body or the magnetic core during plasma generation, and the standby mode temperature controller may selectively output at least one of a second flow rate control signal for controlling the flow rate of the cooling water to a second flow rate less than the first flow rate, a second temperature control signal for controlling the temperature of the cooling water to a second temperature higher than the first temperature, a second pressure control signal for controlling the pressure of the cooling water to a second pressure lower than the first pressure, and combinations thereof, to prevent overcooling of the reactor body or the magnetic core during standby.

The second flow rate control signal may be applied to a flow rate control valve, the second temperature control signal may be applied to a chiller or cooler for cooling the cooling water, and the second pressure control signal may be applied to a hydraulic pump.

According to another aspect of the present invention, there is provided a cooling method of a plasma reaction device including a reactor body having a gas inlet at a side thereof, a plasma outlet at another side thereof, an annular loop space therein, and a body cooling channel therein, a magnetic core provided in a shape surrounding at least a part of the reactor body, and having a primary coil to generate plasma by exciting a gas in the annular loop space, a cooling block mounted outside the reactor body or the magnetic core, being in thermal contact with the reactor body or the magnetic core, and having a block cooling channel therein, a connecting block having a first water inlet pipe and a first water outlet pipe at a side thereof to supply cooling water at a first temperature, and having a second water inlet pipe and a second water outlet pipe at another side thereof to collect the cooling water at a second temperature higher than the first temperature, and a cooling water circulation line mounted between the connecting block, the cooling block, and the reactor body in such a manner that the cooling water provided through the connecting block passes through the block cooling channel of the cooling block, then passes through the body cooling channel of the reactor body, and is connected by the connecting block, the cooling method including primarily enabling heat exchange by allowing the cooling water to flow from an upper side to a lower side of the cooling block, then secondarily enabling heat exchange by allowing the cooling water to flow from a lower side to an upper side of the reactor body, and circulating the cooling water collected using the connecting block.

Advantageous Effects

In the above-described plasma reaction device and cooling method thereof, according to an embodiment of the present invention, cooling efficiency may be optimized by primarily inducing cooling water to flow downward against thermal convection in a cooling block at a relatively low temperature and by secondarily inducing the cooling water to flow upward according to thermal convection in a reactor body at a relatively high temperature, and generation of particles may be prevented and plasma ignition and retention rates may be increased by preventing overcooling of the reactor body or a magnetic core by reducing a flow rate of the cooling water, increasing a temperature of the cooling water, or reducing a pressure of the cooling water in a standby mode. However, the scope of the present invention is not limited to the above-described effects.

BEST MODE

Figure 1:
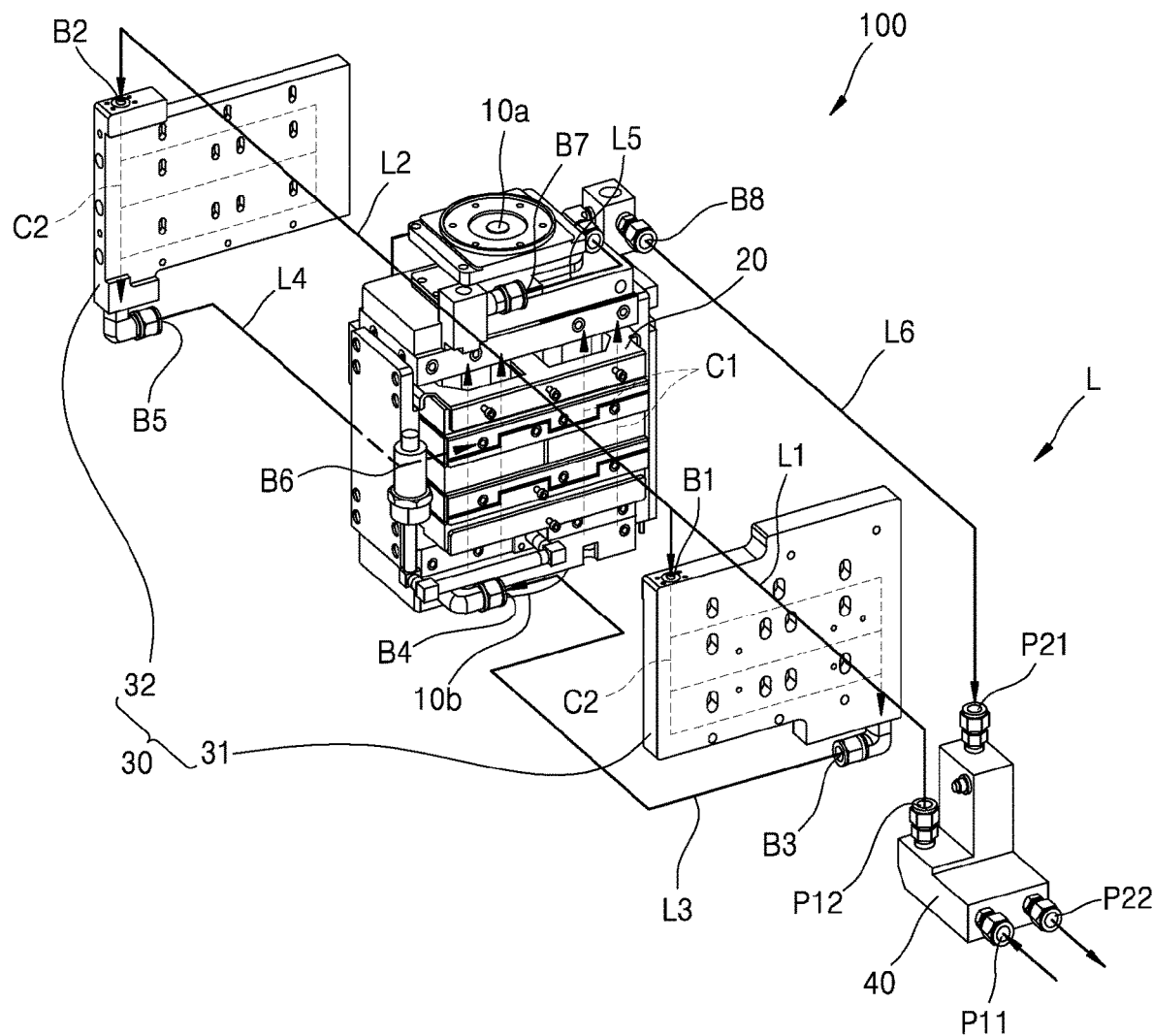
FIG. 1 is an external perspective view of a plasma reaction device according to some embodiments of the present invention.

Hereinafter, the present invention will be described in detail by explaining embodiments of the invention with reference to the attached drawings.

The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, the thicknesses or sizes of layers are exaggerated for clarity and convenience of explanation.

Figure 2:
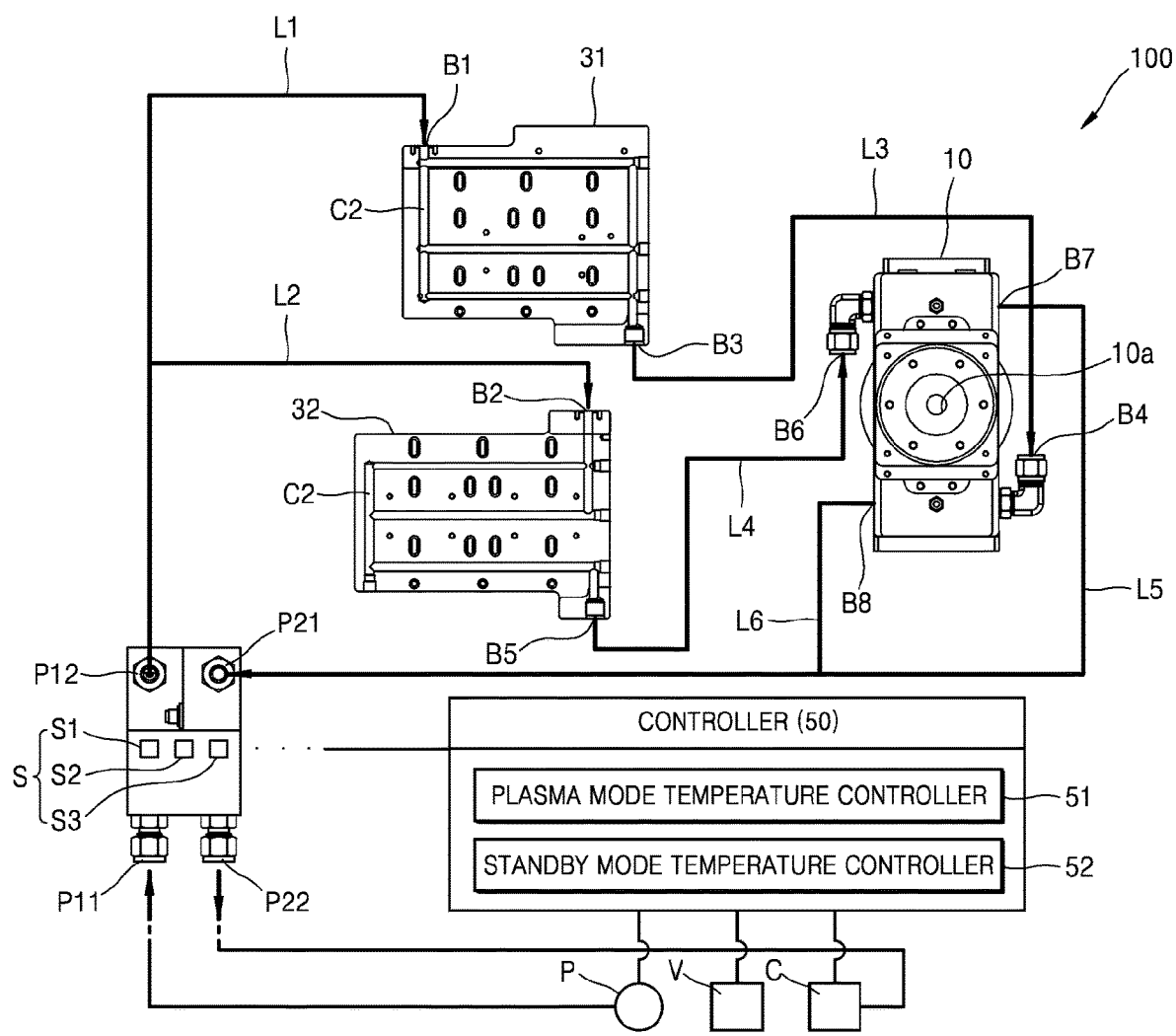
FIG. 2 is a fluid circuit diagram showing cooling water circulation of the plasma reaction device of FIG. 1.

FIG. 1 is an external perspective view of a plasma reaction device 100 according to some embodiments of the present invention. FIG. 2 is a fluid circuit diagram showing cooling water circulation of the plasma reaction device of FIG. 1.

As illustrated in FIGS. 1 and 2, the plasma reaction device 100 according to some embodiments of the present invention may mainly include a reactor body 10, a magnetic core 20, a cooling block 30, a connecting block 40, and a cooling water circulation line L.

For example, as illustrated in FIGS. 1 and 2, the reactor body 10 may use a remote plasma generator (RPG) of a toroidal shape, i.e., a transformer-coupled type, and have a gas inlet 10a at a side thereof, a plasma outlet 10b at another side thereof, and an annular loop space therein, and also have therein a body cooling channel C1 through which cooling water (e.g., process cooling water (PCW)) flows.

For example, as illustrated in FIG. 1, the reactor body 10 may include a first portion (e.g., an upper portion) provided at a part of the reactor body 10, and a second portion (e.g., a lower portion) provided at another part of the reactor body 10 to correspond to the first portion to generate an ignition electromotive force.

Herein, the reason why the reactor body 10 is provided in two pieces, i.e., the above-described first and second portions, may be to ignite plasma discharge between the first and second portions of the reactor body 10 and to generate an ignition or retention electromotive force to retain the same.

That is, the first portion may be an upper splitting tube provided at an upper side of the reactor body 10, and the second portion may be a lower combining tube provided at a lower side of the reactor body 10. Although not shown in FIGS. 1 and 2, an insulating member or a sealing member may be mounted between the upper splitting tube and the lower combining tube.

Therefore, a cleaning gas or an exhaust gas before purification may be injected through an entrance of the first portion into the reactor body 10, plasma-ionized or purified in the reactor body 10, and then discharged through an exit of the second portion.

That is, the plasma reaction device 100 of the present invention may be used to clean a process chamber or purify an exhaust gas.

Meanwhile, as illustrated in FIGS. 1 and 2, the magnetic core 20 may be a structure provided in a shape surrounding at least a part of the reactor body 10, and having a primary coil (not shown) to generate plasma by exciting a gas in the annular loop space.

Therefore, to operate the plasma reaction device 100 according to some embodiments of the present invention, when an induced electromotive force is generated in the magnetic core 20 by the primary coil, an annular plasma discharge loop may be formed in the reactor body 10.

Herein, a reaction gas may be supplied into the reactor body 10.

In this case, when reaction gases or exhaust gases of various chambers (not shown) are injected into the reactor body 10, the gases may be excited to a plasma state by receiving plasma energy or harmful components may be burned or purified due to reaction such as oxidation.

Herein, the chambers may include, for example, an ashing chamber for removing a photoresist, a chemical vapor deposition (CVD) chamber configured to deposit an insulating layer, and an etching chamber configured to etching apertures or openings in the insulating layer to form interconnection structures. Alternatively, the chambers may include a physical vapor deposition (PVD) chamber configured to deposit a barrier layer, and a PVD chamber configured to deposit a metal layer.

Meanwhile, for example, as illustrated in FIGS. 1 and 2, the cooling block 30 may be a structure mounted outside the reactor body 10 or the magnetic core 20, being in thermal contact with the reactor body 10 or the magnetic core 20, and having a block cooling channel C2 therein.

Specifically, for example, as illustrated in FIGS. 1 and 2, the cooling block 30 may include a front block 31 mounted in front of the reactor body 10 or in front of the magnetic core 20, and a rear block 32 mounted at the rear of the reactor body 10 or at the rear of the magnetic core 20.

Therefore, the cooling block 20 may be in thermal contact with outer surfaces of the reactor body 10 or the magnetic core 20 to enable heat exchange.

Meanwhile, as illustrated in FIGS. 1 and 2, the connecting block 40 may be a structure having a first water inlet pipe P11 and a first water outlet pipe P12 at a side thereof to supply the cooling water at a first temperature, and having a second water inlet pipe P21 and a second water outlet pipe P22 at another side thereof to collect the cooling water at a second temperature higher than the first temperature.

Therefore, considering that the cooling water is a fluid, and in order to simultaneously measure a flow rate, a temperature, and a pressure of the cooling water at one spot, the connecting block 40 may have the above-described first water inlet and outlet pipes P11 and P12 and second water inlet and outlet pipes P21 and P22 in one block body.

Meanwhile, as illustrated in FIGS. 1 and 2, the cooling water circulation line L may be a cooling water circulation pipe, hose, or tube mounted between the connecting block 40, the cooling block 30, and the reactor body 10 in such a manner that the cooling water provided through the connecting block 40 may pass through the block cooling channel C2 of the cooling block 30, then pass through the body cooling channel C1 of the reactor body 10, and be connected by the connecting block 40.

Specifically, for example, as illustrated in FIGS. 1 and 2, the cooling water circulation line L may include a first cooling line L1 having an end connected to the first water outlet pipe P12 of the connecting block 40, and another end connected to a first block upper inlet B1 of the front block 31, a second cooling line L2 having an end connected to the first water outlet pipe P12, and another end connected to a second block upper inlet B2 of the rear block 32, a third cooling line L3 having an end connected to a first block lower outlet B3 of the front block 31, and another end connected to a first body lower inlet B4 of the reactor body 10, a fourth cooling line L4 having an end connected to a second block lower outlet B5 of the rear block 32, and another end connected to a second body lower inlet B6 of the reactor body 10, a fifth cooling line L5 having an end connected to a third body upper outlet B7 of the reactor body 10, and another end connected to the second water inlet pipe P21 of the connecting block 40, and a sixth cooling line L6 having an end connected to a fourth body upper outlet B8 of the reactor body 10, and another end connected to the second water inlet pipe P21 of the connecting block 40.

Therefore, using the above-described cooling water circulation line L, heat exchange may be primarily enabled by allowing the cooling water to flow from an upper side to a lower side of the cooling block 30, then secondarily enabled by allowing the cooling water to flow from a lower side to an upper side of the reactor body 10, and the cooling water collected using the connecting block 40 may be circulated.

As such, cooling efficiency may be optimized by primarily inducing the cooling water to flow downward against thermal convection in the cooling block 30 at a relatively low temperature and by secondarily inducing the cooling water to flow upward according to thermal convection in the reactor body 10 at a relatively high temperature.

Meanwhile, as illustrated in FIG. 2, the plasma reaction device 100 according to some embodiments of the present invention may further include a measurement sensor S mounted on the connecting block 40 to selectively measure at least one of a flow rate, a temperature, and a pressure of the cooling water, and combinations thereof, and a controller 50 for receiving a measurement signal from the measurement sensor S to selectively output at least one of a flow rate control signal, a temperature control signal, and a pressure control signal for the cooling water, and combinations thereof.

Specifically, for example, the measurement sensor S may selectively include at least one of a flow rate sensor S1 mounted on the connecting block 40 to measure the flow rate of the cooling water, a temperature sensor S2 mounted on the connecting block 40 to measure the temperature of the cooling water, a pressure sensor S3 mounted on the connecting block 40 to measure the pressure of the cooling water, and combinations thereof.

As illustrated in FIG. 2, the controller 50 may include a plasma mode temperature controller 51 capable of controlling the reactor body 10 or the magnetic core 20 to a plasma mode temperature during plasma generation, and a standby mode temperature controller 52 capable of controlling the reactor body 10 or the magnetic core 20 to a standby mode temperature during standby.

Specifically, for example, the plasma mode temperature controller 51 may selectively output at least one of a first flow rate control signal for controlling the flow rate of the cooling water to a first flow rate, a first temperature control signal for controlling the temperature of the cooling water to a first temperature, a first pressure control signal for controlling the pressure of the cooling water to a first pressure, and combinations thereof, to prevent overheating of the reactor body 10 or the magnetic core 20 during plasma generation.

The standby mode temperature controller 52 may selectively output at least one of a second flow rate control signal for controlling the flow rate of the cooling water to a second flow rate less than the first flow rate, a second temperature control signal for controlling the temperature of the cooling water to a second temperature higher than the first temperature, a second pressure control signal for controlling the pressure of the cooling water to a second pressure lower than the first pressure, and combinations thereof, to prevent overcooling of the reactor body 10 or the magnetic core 20 during standby.

Herein, the above-described controllers may be provided in the form of various electronic components, e.g., microprocessors, a central processing unit (CPU), or substrates, various circuits, or various programs or electrical signals, and a detailed description thereof is not provided.

As illustrated in FIG. 2, for example, the second flow rate control signal may be applied to a flow rate control valve V, the second temperature control signal may be applied to a chiller or cooler C for cooling the cooling water, and the second pressure control signal may be applied to a hydraulic pump P.

Therefore, in a standby mode when plasma is not generated, because no plasma heating source is present, generation of particles may be prevented and plasma ignition and retention rates may be increased by preventing overcooling of a the reactor body or the magnetic core by reducing a flow rate of the cooling water, increasing a temperature of the cooling water, or reducing a pressure of the cooling water.

Meanwhile, a cooling method of a plasma reaction device, according to some embodiments of the present invention, uses the above-described plasma reaction device 100 and may include primarily enabling heat exchange by allowing the cooling water to flow from an upper side to a lower side of the cooling block 30, then secondarily enabling heat exchange by allowing the cooling water to flow from a lower side to an upper side of the reactor body 10, and circulating the cooling water collected using the connecting block 40.

As such, because the cooling water may not flow upward all the time, by allowing the cooling water to flow downward at a relatively low temperature and flow upward at a relatively high temperature, thermal convection is utilized as much as possible and thus cooling efficiency may be maximized.

While the present invention has been particularly shown and described with reference to embodiments thereof, it will be understood by one of ordinary skill in the art that various changes in form and details may be made therein without departing from the scope of the present invention as defined by the following claims.

INDUSTRIAL APPLICABILITY

In the above-described plasma reaction device and cooling method thereof, according to an embodiment of the present invention, generation of particles inside may be prevented and plasma ignition and retention rates may be increased by increasing plasma generation efficiency and preventing overcooling of a reactor body or a magnetic core by accurately controlling a flow rate, a temperature, or a pressure of cooling water.

The invention claimed is:
1. A plasma reaction device comprising:
 a reactor body having a gas inlet at a side thereof, a plasma outlet at another side thereof, an annular loop space therein, and a body cooling channel therein;
 a magnetic core provided in a shape surrounding at least a part of the reactor body, and having a primary coil to generate plasma by exciting a gas in the annular loop space;
 a cooling block mounted outside the reactor body or the magnetic core, being in thermal contact with the reactor body or the magnetic core, and having a block cooling channel therein;
 a connecting block having a first water inlet pipe and a first water outlet pipe at a side thereof to supply cooling water at a first temperature, and having a second water inlet pipe and a second water outlet pipe at another side thereof to collect the cooling water at a second temperature higher than the first temperature; and
 a cooling water circulation line mounted between the connecting block, the cooling block, and the reactor body in such a manner that the cooling water provided through the connecting block passes through the block cooling channel of the cooling block, then passes through the body cooling channel of the reactor body, and is connected by the connecting block.

2. The plasma reaction device of claim 1, wherein the cooling block comprises:
 a front block mounted in front of the reactor body or in front of the magnetic core; and
 a rear block mounted at rear of the reactor body or at rear of the magnetic core, and
 wherein the cooling water circulation line comprises:
 a first cooling line having an end connected to the first water outlet pipe of the connecting block, and another end connected to a first block upper inlet of the front block;
 a second cooling line having an end connected to the first water outlet pipe, and another end connected to a second block upper inlet of the rear block;
 a third cooling line having an end connected to a first block lower outlet of the front block, and another end connected to a first body lower inlet of the reactor body;
 a fourth cooling line having an end connected to a second block lower outlet of the rear block, and another end connected to a second body lower inlet of the reactor body;
 a fifth cooling line having an end connected to a third body upper outlet of the reactor body, and another end connected to the second water inlet pipe of the connecting block; and a sixth cooling line having an end connected to a fourth body upper outlet of the reactor body, and another end connected to the second water inlet pipe of the connecting block.

3. The plasma reaction device of claim 1, further comprising
a measurement sensor mounted on the connecting block to selectively measure at least one of a flow rate, a temperature, and a pressure of the cooling water, and combinations thereof; and
a controller for receiving a measurement signal from the measurement sensor to selectively output at least one of a flow rate control signal, a temperature control signal, and a pressure control signal for the cooling water, and combinations thereof.

4. The plasma reaction device of claim 3, wherein the controller comprises:
a plasma mode temperature controller capable of controlling the reactor body or the magnetic core to a plasma mode temperature during plasma generation; and
a standby mode temperature controller capable of controlling the reactor body or the magnetic core to a standby mode temperature during standby.

5. The plasma reaction device of claim 4, wherein the plasma mode temperature controller selectively outputs at least one of a first flow rate control signal for controlling the flow rate of the cooling water to a first flow rate, a first temperature control signal for controlling the temperature of the cooling water to a first temperature, a first pressure control signal for controlling the pressure of the cooling water to a first pressure, and combinations thereof, to prevent overheating of the reactor body or the magnetic core during plasma generation, and
wherein the standby mode temperature controller selectively outputs at least one of a second flow rate control signal for controlling the flow rate of the cooling water to a second flow rate less than the first flow rate, a second temperature control signal for controlling the temperature of the cooling water to a second temperature higher than the first temperature, a second pressure control signal for controlling the pressure of the cooling water to a second pressure lower than the first pressure, and combinations thereof, to prevent overcooling of the reactor body or the magnetic core during standby.

6. The plasma reaction device of claim 5, wherein the second flow rate control signal is applied to a flow rate control valve, the second temperature control signal is applied to a chiller or cooler for cooling the cooling water, and the second pressure control signal is applied to a hydraulic pump.

7. A cooling method of a plasma reaction device comprising a reactor body having a gas inlet at a side thereof, a plasma outlet at another side thereof, an annular loop space therein, and a body cooling channel therein, a magnetic core provided in a shape surrounding at least a part of the reactor body, and having a primary coil to generate plasma by exciting a gas in the annular loop space, a cooling block mounted outside the reactor body or the magnetic core, being in thermal contact with the reactor body or the magnetic core, and having a block cooling channel therein, a connecting block having a first water inlet pipe and a first water outlet pipe at a side thereof to supply cooling water at a first temperature, and having a second water inlet pipe and a second water outlet pipe at another side thereof to collect the cooling water at a second temperature higher than the first temperature, and a cooling water circulation line mounted between the connecting block, the cooling block, and the reactor body in such a manner that the cooling water provided through the connecting block passes through the block cooling channel of the cooling block, then passes through the body cooling channel of the reactor body, and is connected by the connecting block, the cooling method comprising:
primarily enabling heat exchange by allowing the cooling water to flow from an upper side to a lower side of the cooling block, then secondarily enabling heat exchange by allowing the cooling water to flow from a lower side to an upper side of the reactor body, and circulating the cooling water collected using the connecting block.

* * * * *